United States Patent [19]

Cook et al.

[11] Patent Number: 4,661,284

[45] Date of Patent: Apr. 28, 1987

[54] SILICA AND BORON-CONTAINING ULTRAPHOSPHATE LASER GLASS WITH LOW CONCENTRATION QUENCHING AND IMPROVED THERMAL SHOCK RESISTANCE

[75] Inventors: Lee M. Cook, Duryea, Pa.; Stanley E. Stokowski, Danville, Calif.

[73] Assignee: The United States of America as represented by the United States Department of Energy, Washington, D.C.

[21] Appl. No.: 779,916

[22] Filed: Sep. 25, 1985

[51] Int. Cl.$^4$ .................. C03C 3/19; C03C 3/066; C03C 3/068; C09K 11/81

[52] U.S. Cl. ............... 252/301.4 P; 252/301.4 F; 252/301.6 P; 252/301.6 F; 501/47; 501/78; 501/79; 501/903

[58] Field of Search ............ 501/47, 78, 79, 903; 252/301.4 P, 301.6 P, 301.4 F, 301.6 F

[56] References Cited

U.S. PATENT DOCUMENTS 3,979,322 9/1976 Alexeev et al. .................. 501/47
4,075,120 2/1978 Myers et al. ................ 252/301.4 P

FOREIGN PATENT DOCUMENTS 3435133 4/1985 Fed. Rep. of Germany .
5342334 9/1976 Japan .
1409726 10/1975 United Kingdom ............ 501/47

OTHER PUBLICATIONS

Zhabotinski, M. E., "Laser Phosphate Glasses", Navka publ., Moscow, 1980.

*Primary Examiner*—Mark L. Bell
*Attorney, Agent, or Firm*—Millen & White

[57] ABSTRACT

Neodymium-doped phosphate glasses having a refractive index, $nd > 1.520$; an Abbe number, $V_d$, $<60$; a density $<3.0$ g/cm$^3$, a thermal expansion coefficient, $\alpha$, $\leq 110 \times 10^{-7}$°C.$^{-1}$; a Young's Modulus, E, $<70 \times 10^3$ N/mm$^2$; a Poisson's Ratio, $\nu$, $<0.28$; a thermal conductivity, K, $>0.5$ W/m·K, a thermal FOM $=(1-\nu) \cdot K/\alpha \cdot E > 0.7$, consisting essentially of, in mol. %:

P$_2$O$_5$: 40–70%
SiO$_2$: 0–20%
B$_2$O$_3$: 5–20%
Sum SiO$_2$+B$_2$O$_3$: 5–35%
Sum Li$_2$O+Na$_2$O+K$_2$O: 5–20%
Sum La$_2$O$_3$+Nd$_2$O$_3$: 3–10%
Sum MgO+CaO+SrO+BaO+ZnO: 0–10% and preferably containing an amount of Nd$_2$O$_3$ effective for laser activity having an emission cross-section, $\sigma$, $>3.5 \times 10^{-20}$ cm$^2$; a fluorescence linewidth $(\Delta\lambda_{fl}) < 23.5$ nm; a first e-folding time of the Nd$^{3+}$ fluorescence at 0.5 wt. % Nd$_2$O$_3 > 375$ µsec, and a first e-folding time of the Nd$^{3+}$ fluorescence at 10 wt. % $>175$ µsec at 10 wt. %, have very low self-concentration quenching rates.

20 Claims, No Drawings

SILICA AND BORON-CONTAINING ULTRAPHOSPHATE LASER GLASS WITH LOW CONCENTRATION QUENCHING AND IMPROVED THERMAL SHOCK RESISTANCE

BACKGROUND OF THE INVENTION

This invention relates to neodymium-doped phosphate laser glasses having a high stimulated emission cross-section together with desirably low self-concentration quenching of the neodymium fluorescence and high thermal shock resistance, in comparison to prior-art and commercially-available phosphate laser glasses.

Glass is an attractive host material for neodymium lasers. It is easy to prepare in high optical quality and large-size relative to crystals, and a broad and continuously adjustable range of properties may be produced.

For high average power, high repetition rate glass lasers useful for materials processing, or other applications such as miniaturized lasers for integrated optics, it is desirable to provide active materials with high induced emission cross-sections ($\sigma$) which can tolerate high dopant levels without significant self-concentration quenching, as the gain of the device is proportional to the product of $\sigma$ and the number of activated ions. Most solid-state laser materials such as YAG or glass exhibit significant self-concentration quenching (i.e., transfer of excited state energy between adjacent activator ions) at relatively low ion concentrations, typically $\sim 2 \times 10^{20}$ cm$^{-3}$ for glasses. At higher concentrations the quenching becomes increasingly severe, e.g., in the prior art, commercially-available phosphate glass LG-750.

The first material reported to have extremely low concentration quenching was the crystalline ultraphosphate NdP$_5$O$_{14}$, (Danielmeyer, H. G.; Weber, H. P.; IEEE J. Quant. Electron. EQ-8, 805 (1972)) and its glassy analog (Damen. et al., U.S. Pat. No. 3,863,177, Jan. 28, 1975). While glassy NdP$_5$O$_{14}$ has desirable laser properties, it is virtually impossible to produce optical quality glass in commercial quantities and sizes due to its crystallization tendency and the high level of phosphorus volatility, which necessitates production in sealed pressure bombs. Since its introduction, many low quenching rate crystals have been reported.

Low self-concentration quenching rate glasses described in the open literature appear to be confined to two main families, the first in the system R$_2$O.Ln$_2$O$_3$.-P$_2$O$_5$ and the second in the system R$_2$O.Al$_2$O$_3$.Nd$_2$O$_3$.-P$_2$O$_5$ where R$_2$O is Li$_2$O, Na$_2$O, or K$_2$O and Ln = La+Nd. A summary of compositional effects on concentration quenching rate and laser properties in these systems has been given by Cook, et al., SPIE, Proc. 505, 102 (1984) (ref. 1). The composition with the lowest concentration quenching rate reported in that study was Composition 16. This composition was a simple alkali ultraphosphate. Although its quenching rate was somewhat higher than glassy NdP$_5$O$_{14}$, its fluorescence lifetime for all neodymium concentrations below approximately $2 \times 10^{21}$ ions/cm$^3$ was substantially above the latter glass. Additionally, its emission cross-section was substantially higher than glassy NdP$_5$O$_{14}$, making it of greater practical utility for high average power lasers. The glass was also sufficiently stable to allow production by conventional glassmaking techniques.

In the operation of a high average power, high repetition rate glass laser, the exposure of the glass to pump light coupled with absorption of the light by neodymium results in heat build-up within the glass. As laser efficiency decreases rapidly with temperature, it is common for such lasers to be cooled by liquids or gases. This leads to a temperature gradient, and thus a stress gradient, in the glass which can lead to fracture if stresses are great enough. This has been well discussed in the literature; for example, see H. Rawson, PROPERTIES AND APPLICATION OF GLASS, Elsevier 1980, pp. 82–86.

For the case of a sheet of glass of temperature ($T_i$), which is then cooled to a lower surface temperature, $T_o$, the surface tensile stress, $S_t$, produced by the temperature drop is given by, $$S_t = E\alpha(T_i - T_o)/(1-\nu) \tag{1}$$

where E is Young's Modulus, $\alpha$ is the coefficient of thermal expansion, and $\sigma$ is Poisson's Ratio. Based on the need for a glass laser to survive the largest possible temperature gradient in operation, a Figure of Merit (FOM) formula derived from the above equation is often used to rank laser glasses for resistance to thermal shock under moderate heat flow conditions, $$FOM = S_f(1-\nu) * K/E \cdot \alpha \tag{2}$$

where K is the thermal conductivity, and $S_f$ is the tensile strength of the glass (S. W. Freiman, "Fracture Mechanics of Glass", pp. 21–78 in GLASS: SCIENCE AND TECHNOLOGY, D. Uhlmann, N. Kreidl, eds. Academic Press 1980).

The FOM is directly proportional to the maximum temperature gradient that the glass can withstand before fracture occurs; thus the higher the FOM, the more suitable a glass will be for the above applications. Because the range of tensile strength values for glass is primarily determined by the distribution of surface flaws rather than intrinsic material properties, the term $S_f$ is generally omitted from the FOM when making relative comparisons. FOM values quoted hereafter are so calculated.

Table 1 gives a comparison of thermal FOM and related physical and laser properties for the low quenching rate ultraphosphate no. 16 of ref. 1 and a number of commercially-produced phosphate laser glasses. It is clear that the ultraphosphate is unsuitable for practical applications because of its low FOM.

Again, neglecting tensile strength, the physical properties whose variation produce the largest improvement in FOM are the thermal expansion coefficient, Young's Modulus, and thermal conductivity. Thus, for the highest possible FOM one would desire a glass with the lowest possible $\alpha$ and E, and the highest possible K. The compositional influence on the aforementioned physical properties in phosphate glasses is generally known, as reviewed in N. H. Ray, "Compositional-Property Relationships in Inorganic Oxide Glasses," J. Non-Cryst. Solids 15 (1974), p. 423–34. In phosphate glasses, improvements in FOM, i.e., reduction in $\alpha$ and E with increase in K, have been most commonly achieved by additions of Al$_2$O$_3$. Indeed, virtually every prior-art phosphate laser glass contains substantial amounts of aluminum oxide. However, as can be clearly seen in ref. 1, the addition of aluminum to ultraphosphates leads to strong increases in concentration quenching rates and decreases the emission cross-section at those concentrations which are effective in raising the thermal FOM.

Thus, in contradiction to prior-art disclosures, the incorporation of $Al_2O_3$ is contraindicated for laser glasses suitable for high average power applications.

TABLE 1

Data is from Manufacturers' Catalogs Unless Otherwise Noted

| Manufacturer/ Glass Code | K (W/m · K) | $\alpha$ $\times 10^{-7}$ C$^{-1}$ | E $10^3$ N/mm$^2$ | $\nu$ | $\sigma$ ($\times 10^{-20}$ cm$^2$) | Ti at 0.5% ($\mu$sec) $Nd_2O_3$ | Ti at 3% ($\mu$sec) $Nd_2O_3$ | Ti at 10% ($\mu$sec) $Nd_2O_3$ | Thermal F.O.M. |
|---|---|---|---|---|---|---|---|---|---|
| Composition 16, ref. 1 | .49 | 131 | 45 | .270 | 4.0 | 381 $\mu$sec | | 215 $\mu$sec | .61 |
| Schott | | | | | | | | | |
| LG-750 | .62 | 130 | 50.1 | .256 | 4.0 | 390 $\mu$sec | 330 $\mu$sec | 160 $\mu$sec | .71 |
| LG-760 | .67 | 138 | 53.7 | .267 | 4.3 | 380 $\mu$sec | 335 $\mu$sec | 150 $\mu$sec | .66 |
| Hoya | | | | | | | | | |
| LHG-5 | .77 | 98 | 67.8 | .237 | 4.1 | N.D. | 290 $\mu$sec | N.D. | .88 |
| LHG-7 | .72[1] | 112 | 55.3 | .238 | 3.8 | N.D. | 305 $\mu$sec | N.D. | .88 |
| LHG-8 | .58 | 127 | 50.1 | .258 | 4.2 | 410 $\mu$sec | 315 $\mu$sec | 200 $\mu$sec @ 8% | .68 |
| Kigre | | | | | | | | | |
| Q-88 | .74[1] | 92 | 69.9 | .24 | 4.0 | 400 $\mu$sec | 330 $\mu$sec | 130 $\mu$sec | .87 |
| Q-98 | .82 | 99 | 70.7 | .24 | 4.5 | 400 $\mu$sec | 350 $\mu$sec | 130 $\mu$sec | .89 |
| Q-100 | .82 | 115 | 70.1 | .24 | 4.4 | | | | .77 |

[1]Source - Laser Glass Handbook, M. J. Weber, ed., Lawrence Livermore National Laboratory It is also known that both $B_2O_3$ and $SiO_2$ may be added to phosphate glasses in order to reduce the thermal expansion coefficient and improve the mechanical strength. This is generally discussed in LASER PHOSPHATE GLASSES, M. E. Zhabotinskii, ed., Nauka publ., Moscow, 1980. Phosphate laser glasses incorporating silica, and boron in theory, have also been disclosed very generically in the patent literature (see Japanese Pat. No. 7842334(no B), German Pat. No. DE 3435133 and U.S. Pat. No. 4,075,120). These glasses, particularly those disclosed in German Pat. No. DE 3435133, show thermal expansion coefficients of $80$–$94 \times 10^{-7}$C°$^{-1}$, which generally are significantly lower than the aluminophosphate laser glasses summarized in Table 2 below. Insufficient information was disclosed to allow calculation of thermal F.O.M. However, these silicaphosphate glasses do not have concentration quenching rates significantly different from aluminophosphate glasses (see Table 2, No. DE 3435133). The U.S. patent does not give any data on physical or laser properties of its examples; it incorporates $SiO_2$ as an antisolarant only.

SUMMARY OF THE INVENTION

Accordingly, it is an object of this invention to provide a neodymium-doped silica and/or boron-containing ultraphosphate laser glass, and the corresponding laser devices, optical elements, etc., of relatively low self-concentration quenching rate, high thermal shock resistance and high induced emission cross-section compared to prior-art phosphate laser glasses.

Upon further study of the attached specification and claims, further objects and advantages of the invention will become apparent to those skilled in the art.

The above objects have been attained by the present invention by providing an optical quality glass suitable for use as a laser, containing amounts of Nd effective for lasing, and having an induced emission cross-section, $\sigma$, of at least 3.5, a first e-folding time of the neodymium fluorescence at a doping level of 10 wt. % $Nd_2O_3$ of at least 175 $\mu$sec, and a thermal figure of merit of at least 0.70 which consists esentially of, in molar percent:

| | | Preferred |
|---|---|---|
| $P_2O_5$ | 40–70% | 50–60 |
| $SiO_2$ | 0–20% | 10–20 |
| $B_2O_3$ | 5–20% | 10–15 |
| Sum $SiO_2$ + $B_2O_3$ | 5–35% | 15–35 |
| Sum $Li_2O$ + $Na_2O$ + $K_2O$ | 5–20% | 5–10 |
| Sum $La_2O_3$ + $Nd_2O$ | 3–10% | 5–8 |
| Sum $MgO$ + $CaO$ + $SrO$ + $BaO$ + $ZnO$ | 0–10% | 5–10 |

DETAILED DISCUSSION

The glasses of this invention have emission cross-sections ($\sigma$), fluorescence linewidths ($\Delta\lambda$) and low $Nd^{3+}$ concentration fluorescence lifetimes similar to other commercially-utilized prior-art laser glasses as previously described. They are substantially different in that they combine these properties with desirable thermal shock-related properties; specifically, low thermal expansion coefficients, low Young's Modulus, and high thermal conductivity with extremely low self-concentration quenching rates. They thus provide fluorescence lifetimes at very high $Nd^{3+}$ doping levels ($\sim 10\%$ $Nd_2O_3$ by weight) far higher than other prior-art glasses.

This desirable combination of properties is achieved by substituting $SiO_2$ and $B_2O_3$ for $P_2O_5$ and $K_2O$ in an aluminum-free, ultraphosphate base glass of composition essentially similar to those disclosed in reference 1. The effectiveness of this substitution was not suggested in prior-art laser glass disclosures, which utilize almost entirely $Al_2O_3$ to achieve requisite physical properties and neglect compositional effects on self-concentration quenching of the activator ion. The closest prior-art patent (Germany No. DE 3435133) utilizes a combination of $SiO_2$ and, in theory, $B_2O_3$ in combination with $P_2O_5$ and, optionally, with $Al_2O_3$, to provide glasses with low expansion coefficient. However, as mentioned above, the range of composition used leads to glasses with relatively high self-concentration quenching. The glasses of this invention exclude amounts of $Al_2O_3$, e.g., all substantial amounts having an effect on the glass properties. Additionally, the theoretical maximum range of $B_2O_3$ (0–5 mol. %) is below the range for the present invention (5–20% and preferably >5 to 20%, including 5.01, 5.1, 5.2, 5.3, 5.4, 5.5, etc.) Also, in that patent, $B_2O_3$ is disclosed as interchangeable with $La_2O_3$ and $Y_2O_3$. This is not the case for the present invention, as the three compounds do not play the same structural role in the phosphate glasses of the invention. The criticality of $B_2O_3$ per this invention is not suggested.

The preferred compositional ranges of this invention are generally 50-60 mol. % $P_2O_5$, 10-20 mol. % $SiO_2$, 10-15 mol. % $B_2O_3$, 5-10 mol. % $K_2O$, 0-10 mol. % ZnO, 5 mol. % or 4.5-5.5 mol % sum $La_2O_3+Nd_2O_3$, where the sum $SiO_2+B_2O_3$ is 15-35 mol. %. As regards the criticality of the preferred ranges, the most critical are $P_2O_5$, $SiO_2$, $B_2O_3$ and $K_2O$.

For $P_2O_5$, above 60 mol. %, no advantage with respect to concentration quenching is obtained while thermal expansion coefficient increases and thermal conductivity decreases, making thermal shock resistance poorer. Below 50 mol. %, glasses become more difficult to melt due to increased viscosity. Below 40 mol. %, concentration quenching of $Nd^{3+}$ increases sharply.

For $SiO_2$, below 10 mol. % incorporation gives little improvement in thermal shock-related properties, specifically thermal expansion coefficient and thermal conductivity. Above 20 mol. %, concentration quenching of $Nd^{3+}$ rapidly increases and emission cross-section becomes undesirably low. Additionally, glasses become increasingly unstable, giving devitrification and phase separation. Also, the melt viscosity becomes undesirably high.

For $B_2O_3$, concentrations below 10 mol. % give only slight improvements in thermal FOM, and below 5 mol. % there is no noticeable improvement at all. Above 15 mol. %, while thermal conductivity continues to increase, Young's Modulus also increases sharply, which is undesirable. Above 20 mol. %, volatile losses of $B_2O_3$ and $P_2O_5$ become excessive and melt viscosities become undesirably high. Additionally, concentration quenching begins to increase strongly, emission cross-section becomes undesirably low, and the fluorescence linewidth increases, indicating that there is a distinct change in the structural role of $B_2O_3$ at those levels.

Alkali content is particularly critical. Preferred glasses utilize potassium only as concentration quenching rates increase in the order $K_2O<Na_2O<Li_2O$. Below 5 mol. %, $P_2O_5$ volatility becomes undesirably high; and, in the presence of $B_2O_3$ and $SiO_2$, melt viscosity becomes undesirably high. Above 10 mol. %, the thermal expansion coefficient becomes undesirably high if good thermal shock resistance is desired. Above 20 mol. % or below 5 mol. %, concentration quenching rates increase strongly.

The function of additions of alkaline earth elements, MgO, CaO, SrO, BaO, and particularly ZnO, is to improve chemical durability without changing the emission cross-section. Above 10 mol. % incorporation, concentration quenching rates increase sharply. Below 5 mol. %, there is little effect.

$La_2O_3$ is included as a structural replacement of $Nd_2O_3$ where necessary, thereby enabling attainment of the desirable thermal properties of the invention at all useful doping levels. This allows continuously variable adjustment of $Nd^{3+}$ from very low to very high doping levels ($\sim$20 wt. %) without significant change in physical, optical, or laser properties as long as the molar sum $Nd_2O_3+La_2O_3$ is kept in the range of the invention. The amount of Nd ions is not critical. The amount used in a given case will be selected routinely to be effective for lasing under the chosen conditions. Often, the amount will be 0.1 to about 3 or 4 mol. %, but significant lower or higher amounts can be employed where suitable.

It is possible to add conventional refining agents such as $As_2O_3$ and $Sb_2O_3$; amounts of 0.1-0.3 wt. % being generally sufficient.

It is additionally possible to add conventional antisolarants such as $TiO_2$, $CeO_2$, and $Nb_2O_5$ in amounts as needed, e.g., 0.1-0.5 wt. %. In strong contrast to U.S. Pat. No. 4,075,120, $SiO_2$ is not added as an antisolarant in this invention but is an integral structural component added in amounts well in excess of what would be needed to suppress solarization.

The glasses of this invention have the following properties:

(a) refractive index, nd, $\geq 1.520$, generally 1.525-1.537;
(b) Abbe number, Vd, $>60$, generally 63-67;
(c) densities $<3.0$ g/cm$^3$, generally 2.6-2.8;
(d) thermal expansion coefficients $\leq 110 \times 10^{-7}$°C$^{-1}$, generally 80-110;
(e) Young's Modulus, E, $<70 \times 10^3$ N/mm$^2$, generally 45-55;
(f) Poisson's Ratio, $\nu$, $<28$, generally 0.20-0.25;
(g) thermal conductivity, K, $>0.5$ W/m.K, generally 0.6-0.8;
(h) thermal FOM's $(1-\nu) \cdot K/\alpha E > 0.7$ generally 0.9-1.2;
(i) induced emission cross-section, $\sigma$, $>3.5 \times 10^{-20}$ cm$^2$, typically 3.8-4.5 or 3.87-4.5;
(j) fluorescence linewidth $(\Delta\lambda_{fl})<23.5$ nm, typically 21-23 nm; and
(k) first e-folding time of the $Nd^{3+}$ fluorescence $>375$ µsec at 0.5 wt % and $>175$ at 10 wt. %, typically 385-400 µsec and 180-185 µsec, respectively.

These glasses can be prepared by conventional methods used to prepare phosphate glasses, usually utilizing platinum crucibles. Similarly, optical elements or laser devices can be prepared from the glasses using conventional techniques.

Without further elaboration, it is believed that one skilled in the art can, using the preceeding description, utilize the present invention to its fullest extent. The following preferred embodiments are, therefore, merely illustrative and not limitative of the remainder of the disclosure in any way. In the following examples, all temperatures are in degrees Celsius; and, unless otherwise indicated, all parts and percentages are molar.

EXAMPLE 1

A number of typical glass compositions within the scope of this invention together with their properties are given in Table 2 in mole %. Also included in this table for comparative purposes is the simple ultraphosphate of reference 1 previously mentioned. Of the compositions given, compositions D, F and G are preferred. Weight % compositions are given in Table 3.

All of the glasses of the examples were fabricated by batch melting. The requisite weights of each batch ingredient corresponding to the desired wt.% were mixed and added to a fused silica crucible and melted by induction heating at $\sim 1350$° C. for 3 hours. The glass was then refined at 1450° C. for 3 hours with stirring and cast at $\sim 1200$° C. The cast glass was annealed at Tg plus 20° C. for 3 hours and cooled at 30° C./hour.

Typically, batch ingredients for each final glass component were $P_2O_5$-$P_2O_5$, $SiO_2$-$SiO_2$, $B_2O_3$-$H_3BO_3$, $K_2O$ - $K_2CO_3$,

TABLE 2

| Mol. % | Composition 16 (ref. 1) | A | B | C | D | E | F | G |
|---|---|---|---|---|---|---|---|---|
| $P_2O_5$ | 70 | 70 | 70 | 70 | 60 | 60 | 55 | 55 |
| $SiO_2$ | | | | | 10 | | 15 | 20 |
| $B_2O_3$ | | 5 | 10 | 15 | 15 | 15 | 20 | 5 |
| $K_2O$ | 20 | 15 | 15 | 10 | 10 | 10 | 5 | 5 |
| ZnO | | | | | | 10 | | 10 |
| $La_2O_3 + Nd_2O_3$ | 10 | 10 | 5 | 5 | 5 | 5 | 5 | 5 |
| Wt. % $Nd_2O_3$ | 10 | 10 | 10 | 10 | 10 | 10 | 10 | 10 |
| $Nd^{3+}$ concentration ($\times 10^{20}$ ions/cm$^3$) | 10.3 | 10.5 | 9.7 | 9.8 | 9.8 | 10.1 | 9.8 | 10.2 |
| Ti/e (μsec) | 215 | 179 | 175 | 177 | 186 | 182 | 185 | 186 |
| σp (calc.) $\times 10^{-20}$ cm$^2$ | 4.02 | 3.96 | 4.67 | 4.63 | 3.87 | 3.85 | 3.56 | 3.80 |
| $\Delta\lambda$FWHM$(nm)$ | 21.6 | 21.8 | 21.2 | 21.5 | 21.8 | 21.9 | 23.1 | 22.1 |
| nd | 1.5366 | 1.5459 | 1.52105 | 1.52993 | 1.53040 | 1.53698 | 1.53714 | 1.53872 |
| Vd | 63.77 | 63.60 | 66.23 | 66.33 | 66.74 | 65.21 | 66.66 | 64.48 |
| Non-linear refractive index $n_2(10^{-13}$ e.s.o.) | 1.23 | 1.27 | 1.11 | 1.14 | 1.13 | 1.19 | 1.16 | 1.22 |
| density (g/cm$^3$) | | 2.93 | 2.71 | 2.74 | 2.73 | 2.82 | 2.74 | 2.85 |
| Tg (°C.) | 431 | 493 | — | 503 | 532 | 486 | 630 | 516 |
| $\alpha$20-300°($\times 10^{-7}$ °C.$^{-1}$) | 131 | 109 | — | 104 | 97 | 99 | 78 | 80 |
| E ($\times 10^3$ N/mm$^2$) | 45 | 51 | 44 | 52 | 55 | 54 | 67 | 56 |
| $\nu$ | .270 | .257 | .257 | .212 | .237 | .247 | .208 | .250 |
| K (W/m · K) | .49 | .54 | .55 | .64 | .69 | .63 | .85 | .692 |
| Thermal FOM $[(1 - \nu) \cdot K/\alpha E]$ | .61 | .72 | — | .93 | .99 | .89 | 1.29 | 1.16 |

TABLE 3

| Wt. % | A | B | C | D | E | F | G |
|---|---|---|---|---|---|---|---|
| $P_2O_5$ | 65.97 | 72.38 | 73.03 | 66.61 | 65.52 | 63.71 | 63.35 |
| $SiO_2$ | | | | 4.70 | | 7.35 | 9.75 |
| $B_2O_3$ | 2.31 | 5.07 | 7.68 | 8.17 | 8.03 | 11.36 | 2.82 |
| $K_2O$ | 9.38 | 10.29 | 6.93 | 7.37 | 7.25 | 3.84 | 3.82 |
| ZnO | | | | | 6.26 | | 6.60 |
| $La_2O_3 + Nd_2O_3$ | 22.34 | 12.26 | 12.37 | 13.16 | 12.94 | 13.73 | 13.65 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical glass having a refractive index, nd > 1.520; an Abbe number, Vd, > 60; a density < 3.0 g/cm$^3$, a thermal expansion coefficient, $\alpha$, $\leq 110 \times 10^{-7}$°C.$^{-1}$; a Young's Modulus, E, $< 70 \times 10^3$ N/mm$^2$; a Poisson's Ratio, $\nu$, 0.28; a thermal conductivity, K, >0.5 W/m K; a thermal FOM=$(1-\nu) \cdot K/\alpha E > 0.7$, a first e-folding time of the Nd$^{3+}$ fluoresence at 0.5 wt % Nd$_2$O$_3$>375 μsec, and a first e-folding time of the Nd$^{3+}$ fluorescence at 10 wt. % >175 μsec.
consisting essentially of, in mol. %:
   $P_2O_5$: 40-70%
   $SiO_2$: 0-20%
   $B_2O_3$: 5-20%
   Sum $SiO_2 + B_2O_3$: 5-35%
   Sum $Li_2O + Na_2O + K_2O$: 5-20%
   Sum $La_2O_3 + Nd_2O_3$: 3-10%
   Sum $MgO + CaO + SrO + BaO + ZnO$: 0-10%.

2. An optical glass of claim 1 having the following properties:
   nd: 1.525-1.537
   Vd: 63-67
   density: 2.6-2.8 g/cm$^3$
   $\alpha$: 80-100 $\times 10^{-7}$°C.$^{-1}$
   E: 45-55 $\times 10^3$ N/mm$^2$
   $\nu$: 0.20-0.25
   K: 0.6-0.8 W/mK
   Thermal FOM: 0.9-1.2.

3. An optical glass of claim 1 containing an amount of Nd$_2$O$_3$ effective for laser activity having an emission cross-section, $\sigma$, >3.5 $\times 10^{-20}$ cm$^2$, and a fluorescence linewidth ($\Delta\lambda_{fl}$)<23.5 nm.

4. An optical glass of claim 3 having the following properties:
   $\sigma$: 3.8-4.5 $\times 10^{20}$ cm$^2$
   $\Delta\lambda_{fl}$: 21-23 nm
   first e-folding time at 0.5 wt. % Nd$_2$O$_3$: 385-400 μsec
   first e-folding time at 10 wt. % Nd$_2$O$_3$: 180-185 μsec.

5. An optical glass of claim 2 containing an amount of Nd$_2$O$_3$ effective for laser activity, having an emission cross-section, $\sigma$, >3.5 $\times 10^{-20}$ cm$^2$; a fluorescence linewidth ($\Delta\lambda_{fl}$)<23.5 nm.

6. An optical glass of claim 2 having the following properties:
   $\sigma$: 3.87-4.5 $\times 10^{20}$ cm$^2$
   $\Delta\lambda_{fl}$: 21-23 nm
   first e-folding time at 0.5 wt. % Nd$_2$O$_3$: 385-400 μsec
   first e-folding time at 10 wt. % Nd$_2$O$_3$: 180-185 μsec.

7. An optical glass of claim 1 wherein the only alkali metal is K.

8. An optical glass of claim 1 consisting essentially of in mol. %:
   $P_2O_5$: 50-60%
   $SiO_2$: 10-20%
   $B_2O_3$: 10-15%
   Sum $SiO_2 + B_2O_3$: 15-35%
   Sum $Li_2O + Na_2O + K_2O$: 5-10%
   Sum $La_2O_3 + Nd_2O_3$: 5-8%
   Sum $MgO + CaO + SrO + BaO + ZnO$: 5-10%.

9. An optical glass of claim 1 consisting essentially of:
   50-60 mol. % $P_2O_5$
   10-20 mol. % $SiO_2$
   10-15 mol. % $B_2O_3$
   5-10 mol. % $K_2O$
   0-10 mol. % ZnO
   4.5-5.5 mol. % sum $La_2O_3 + Nd_2O_3$
   15-35 mol. % sum $SiO_2 + B_2O_3$.

10. An optical glass of claim 9 wherein the sum of $La_2O_3$ and $Nd_2O_3$ is about 5 mol. %.

11. An optical glass of claim 1 consisting essentially of, in mol. %:
$P_2O_5$: about 60%
$SiO_2$: about 10%
$B_2O_3$: about 15%
$K_2O$: about 10%
$Nd_2O_3 + La_2O_3$: about 5%.

12. An optical glass of claim 1 consisting essentially of, in mol. %:
$P_2O_5$: about 55%
$SiO_2$: about 15%
$B_2O_3$: about 20%
$K_2O$: about 5%
$Nd_2O_3 + La_2O_3$: about 5%.

13. An optical glass of claim 1 consisting essentially of, in mol. %:
$P_2O_5$: about 55%
$SiO_2$: about 20%
$B_2O_3$: about 5%
$K_2O$: about 5%
$ZnO$: about 10%
$La_2O_3 + Nd_2O_3$: about 5%.

14. In a laser device comprising a glass active medium, the improvement wherein the active medium is a glass of claim 1.

15. In a laser device comprising a glass active medium, the improvement wherein the active medium is a glass of claim 3.

16. In a laser device comprising a glass active medium, the improvement wherein the active medium is a glass of claim 4.

17. In a laser device comprising a glass active medium, the improvement wherein the active medium is a glass of claim 6.

18. In a laser device comprising a glass active medium, the improvement wherein the active medium is a glass of claim 8.

19. In a laser device comprising a glass active medium, the improvement wherein the active medium is a glass of claim 9.

20. In a laser device comprising a glass active medium, the improvement wherein the active medium consists essentially of, in mol. %, about 60% $P_2O_5$, about 10% $SiO_2$, about 15% $B_2O_3$, about 10% $K_2O$ and about 5% ($Nd_2O_3 + La_2O_3$); or about 55% $P_2O_5$, about 15% $SiO_2$, about 20% $B_2O_3$, about 5% $K_2O$, and about 5% ($Nd_2O_3 + La_2O_3$); or about 55% $P_2O_5$, about 20% $SiO_2$, about 5% $B_2O_3$, about 5% $K_2O$; about 10% $ZnO$, and about 5% ($La_2O_3 + Nd_2O_3$).

* * * * *

UNITED STATES PATENT AND TRADEMARK OFFICE
CERTIFICATE OF CORRECTION

PATENT NO. : 4,661,284

DATED : April 28, 1987

INVENTOR(S) : Lee M. Cook et al

It is certified that error appears in the above-identified patent and that said Letters Patent is hereby corrected as shown below:

Column 1, Title Page,

Under the Title, please add the following paragraph:

The U.S. government has rights in this invention pursuant to contract no. W-7405-Eng-48 awarded by the U.S. Department of Energy.

Signed and Sealed this

Fifteenth Day of September, 1987

Attest:

DONALD J. QUIGG

*Attesting Officer*  *Commissioner of Patents and Trademarks*